(12) United States Patent
Kaieda

(10) Patent No.: US 10,027,875 B2
(45) Date of Patent: Jul. 17, 2018

(54) CONTROL APPARATUS, IMAGING APPARATUS, CONTROL METHOD, IMAGING METHOD, AND NON-TRANSITORY COMPUTER-READABLE STORAGE MEDIUM

(71) Applicant: CANON KABUSHIKI KAISHA, Tokyo (JP)

(72) Inventor: Masaru Kaieda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 52 days.

(21) Appl. No.: 15/168,584

(22) Filed: May 31, 2016

(65) Prior Publication Data

US 2016/0360089 A1 Dec. 8, 2016

(30) Foreign Application Priority Data

Jun. 8, 2015 (JP) ................ 2015-116023

(51) Int. Cl.
*H04N 5/232* (2006.01)
*H04N 5/247* (2006.01)
*H04L 5/00* (2006.01)

(52) U.S. Cl.
CPC ........... *H04N 5/23206* (2013.01); *H04L 5/00* (2013.01); *H04N 5/247* (2013.01)

(58) Field of Classification Search
CPC ....... H04N 5/23206; H04N 5/247; H04L 5/00
See application file for complete search history.

(56) References Cited

U.S. PATENT DOCUMENTS

| | | | | |
|---|---|---|---|---|
| 9,055,171 | B2* | 6/2015 | Fujinawa | H04N 5/23293 |
| 2006/0165405 | A1* | 7/2006 | Kanai | H04N 5/23203 |
| | | | | 396/334 |
| 2012/0032795 | A1* | 2/2012 | Ishii | H04N 5/23203 |
| | | | | 340/539.1 |
| 2012/0206486 | A1* | 8/2012 | Kageyama | H04N 5/247 |
| | | | | 345/634 |
| 2013/0041903 | A1* | 2/2013 | Lindley | G06F 17/30038 |
| | | | | 707/740 |
| 2015/0138396 | A1* | 5/2015 | Sako | H04N 5/23216 |
| | | | | 348/231.6 |
| 2016/0127634 | A1* | 5/2016 | Yamashita | H04N 5/23206 |
| | | | | 348/211.3 |

FOREIGN PATENT DOCUMENTS

| | | |
|---|---|---|
| JP | 2004-328289 A | 11/2004 |
| JP | 2014-143564 A | 8/2014 |

* cited by examiner

*Primary Examiner* — Jason A Flohre
(74) *Attorney, Agent, or Firm* — Carter, DeLuca, Farrell & Schmidt, LLP

(57) ABSTRACT

A control apparatus obtains first data generated by a first imaging apparatus imaging an object and second data generated by a second imaging apparatus imaging an object, evaluates, based on the first data and the second data, a relationship between the object imaged by the first imaging apparatus and the object imaged by the second imaging apparatus, and performs processing for connecting the first imaging apparatus and the second imaging apparatus in accordance with an evaluation result.

13 Claims, 11 Drawing Sheets

F I G. 1B
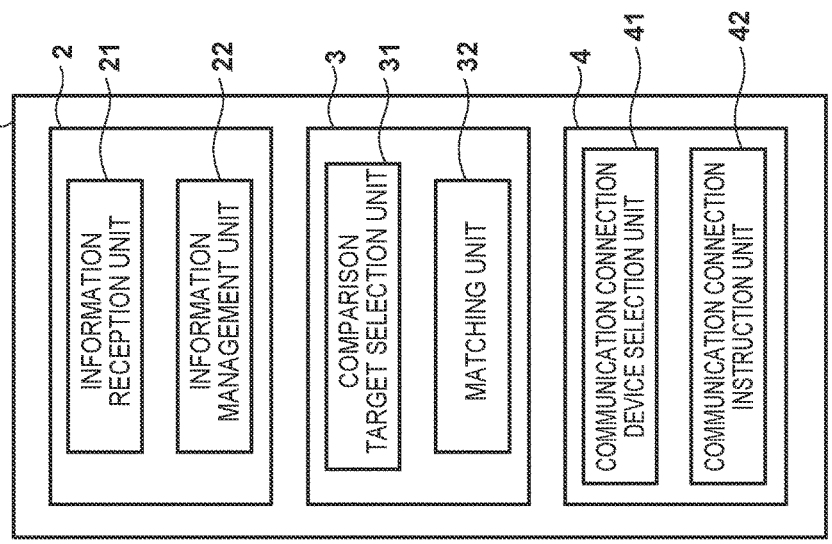
F I G. 1A
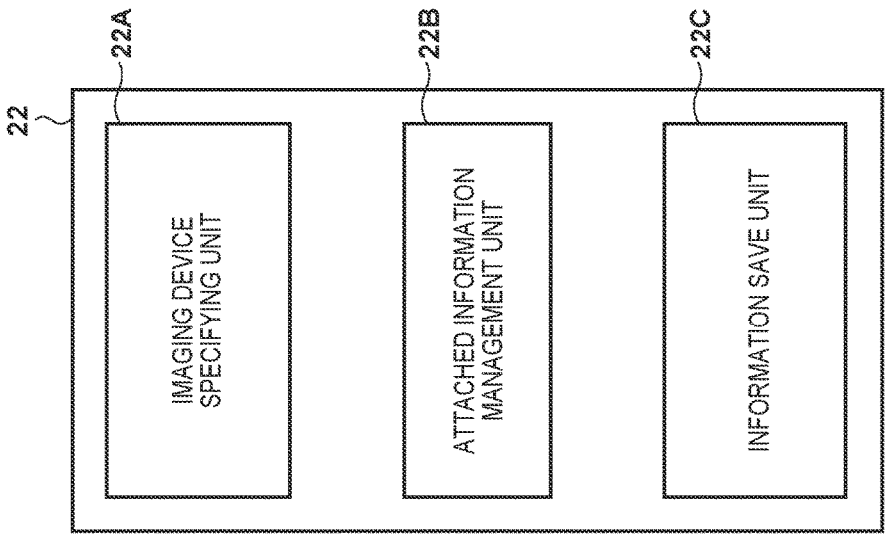

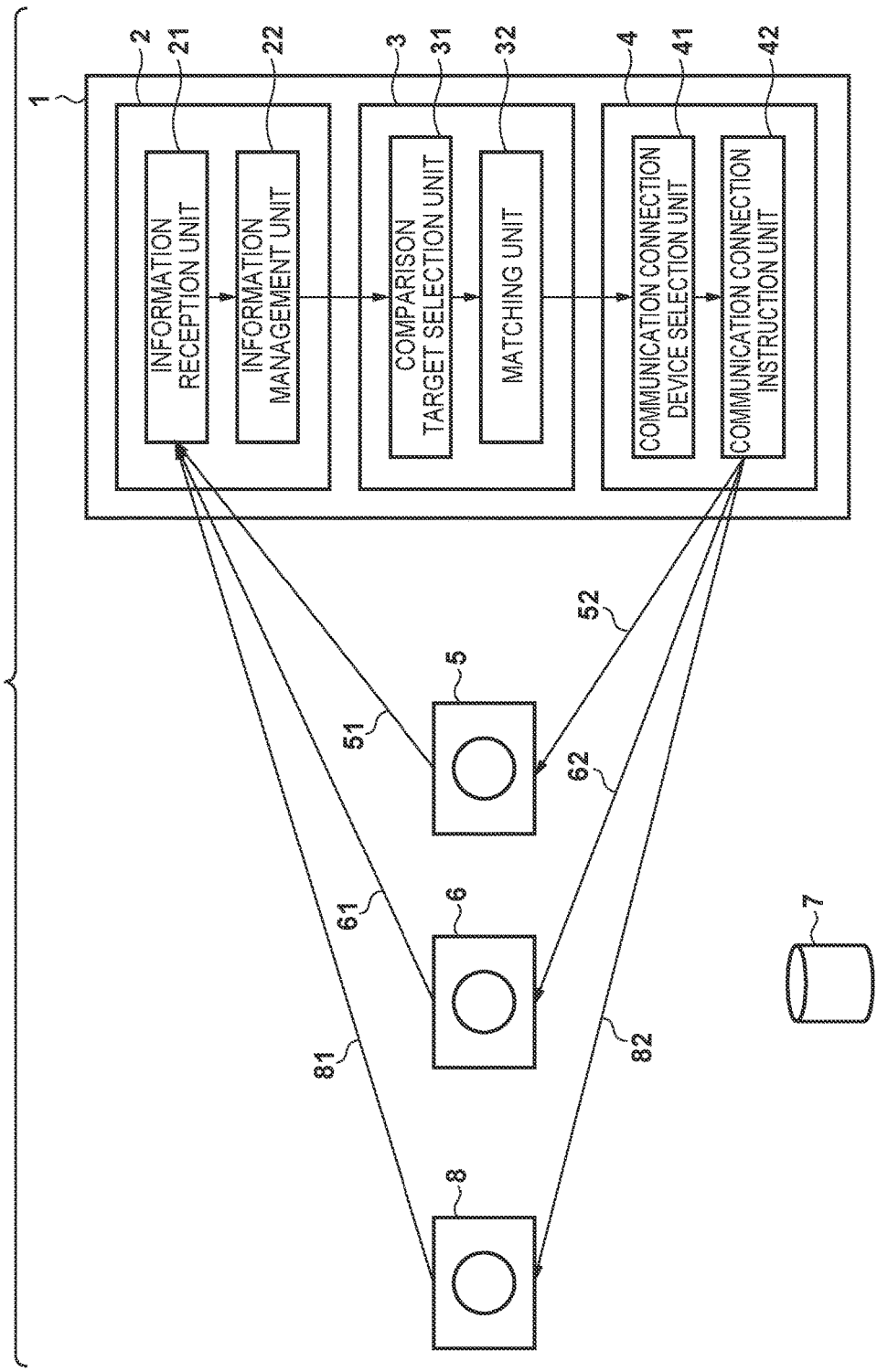

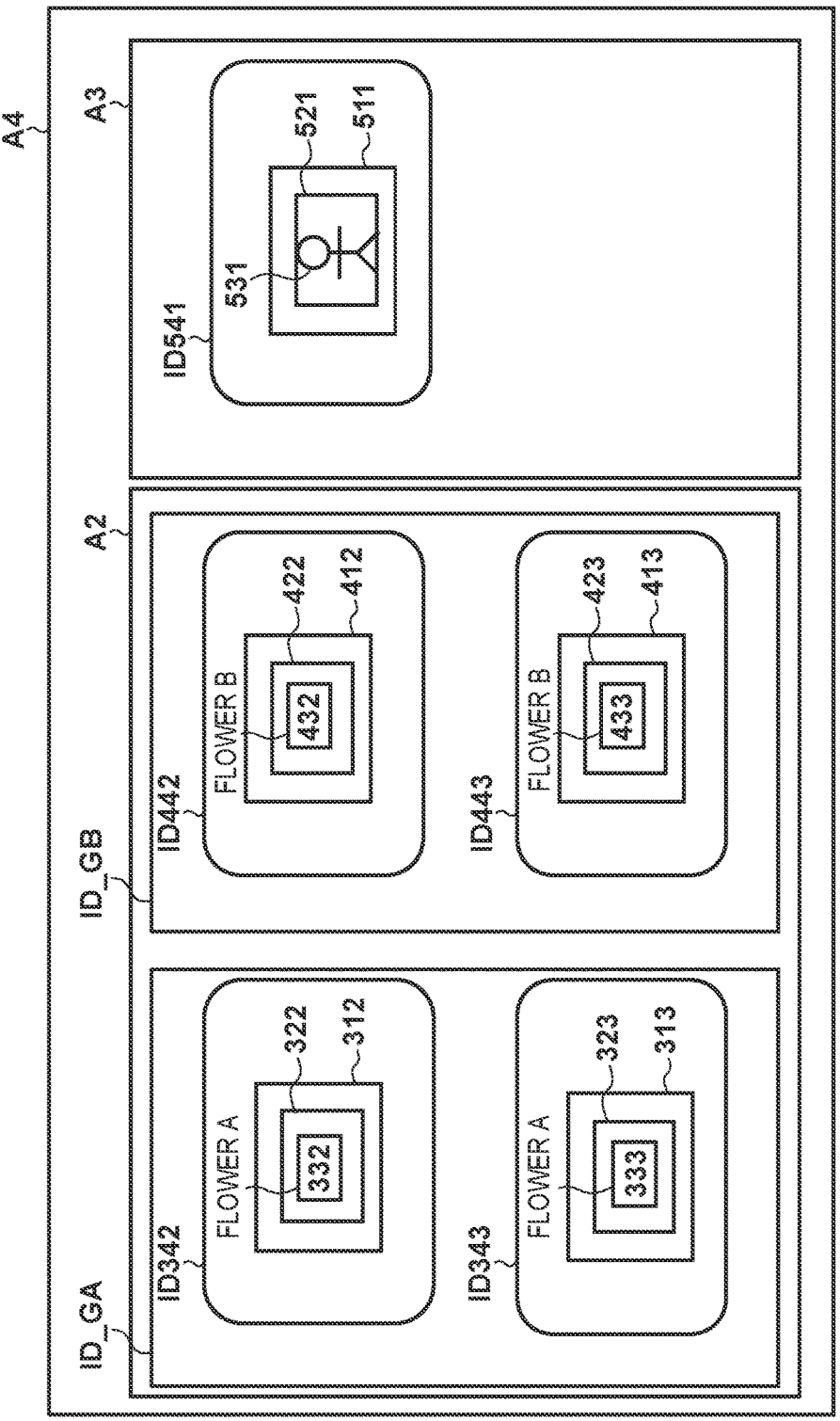

CONTROL APPARATUS, IMAGING APPARATUS, CONTROL METHOD, IMAGING METHOD, AND NON-TRANSITORY COMPUTER-READABLE STORAGE MEDIUM

BACKGROUND OF THE INVENTION

Field of the Invention

The present invention relates to a technique for readily setting communication between devices.

Description of the Related Art

In recent years, along with popularization of communication terminals, communication between devices of an individual person and another person has been often performed to share information between the devices. To perform communication between devices, it is necessary to set communication connection between the target devices. Thus, it has been desired to readily set communication connection. However, pieces of information of connection target devices or pieces of information of individual persons, for example, IP addresses or mail addresses are not always known between the devices to be connected or between the owners. Even if the pieces of information are known, setting becomes complicated to perform communication between the plurality of devices.

As a method of readily setting communication between devices, the following methods have been proposed. Japanese Patent Laid-Open No. 2004-328289 proposes a wireless communication system in which if a wireless communication channel establishment instruction is issued within a predetermined time, a wireless communication channel between the first and second wireless communication apparatuses is established. According to Japanese Patent Laid-Open No. 2004-328289, it is possible to readily perform wireless communication connection between a plurality of wireless communication apparatuses. Japanese Patent Laid-Open No. 2014-143564 proposes a technique in which a communication terminal apparatus can display, on a display unit, access position information obtained by superimposing pieces of position information of a plurality of access points existing in a predetermined space on the layout of the predetermined space. According to Japanese Patent Laid-Open No. 2014-143564, the user of the communication terminal can select a preferable access point in the predetermined space.

In the method proposed in Japanese Patent Laid-Open No. 2004-328289, since all communication apparatuses for which a wireless communication channel establishment instruction is issued within a desired time are selected as connection candidates, problem is posed that a communication apparatus within an unintended range is unwantedly recognized as a connection candidate. On the other hand, in the method proposed in Japanese Patent Laid-Open No. 2014-143564, since all the access points existing in the predetermined space are displayed, problem is posed that selection of an access point to be connected becomes complicated.

SUMMARY OF THE INVENTION

The present invention has been made in consideration of the above problems. According to the first aspect of the present invention, there is provided a control apparatus which comprises: an obtaining unit configured to obtain first data generated by a first imaging apparatus imaging an object and second data generated by a second imaging apparatus imaging an object; an evaluation unit configured to evaluate, based on the first data and the second data which have been obtained by the obtaining unit, a relationship between the object imaged by the first imaging apparatus and the object imaged by the second imaging apparatus; and a processing unit configured to perform processing for connecting the first imaging apparatus and the second imaging apparatus in accordance with an evaluation result of the evaluation unit.

Further features of the present invention will become apparent from the following description of exemplary embodiments (with reference to the attached drawings).

BRIEF DESCRIPTION OF THE DRAWINGS

FIG. 1A is a block diagram showing the functional arrangement of a control apparatus;

FIG. 1B is a block diagram showing the functional arrangement of an information management unit;

FIG. 2 is a view showing information transmission paths of the control apparatus;

FIG. 11 is a schematic view showing the communication connection setting status according to the second embodiment.

DESCRIPTION OF THE EMBODIMENTS

Figure 3:
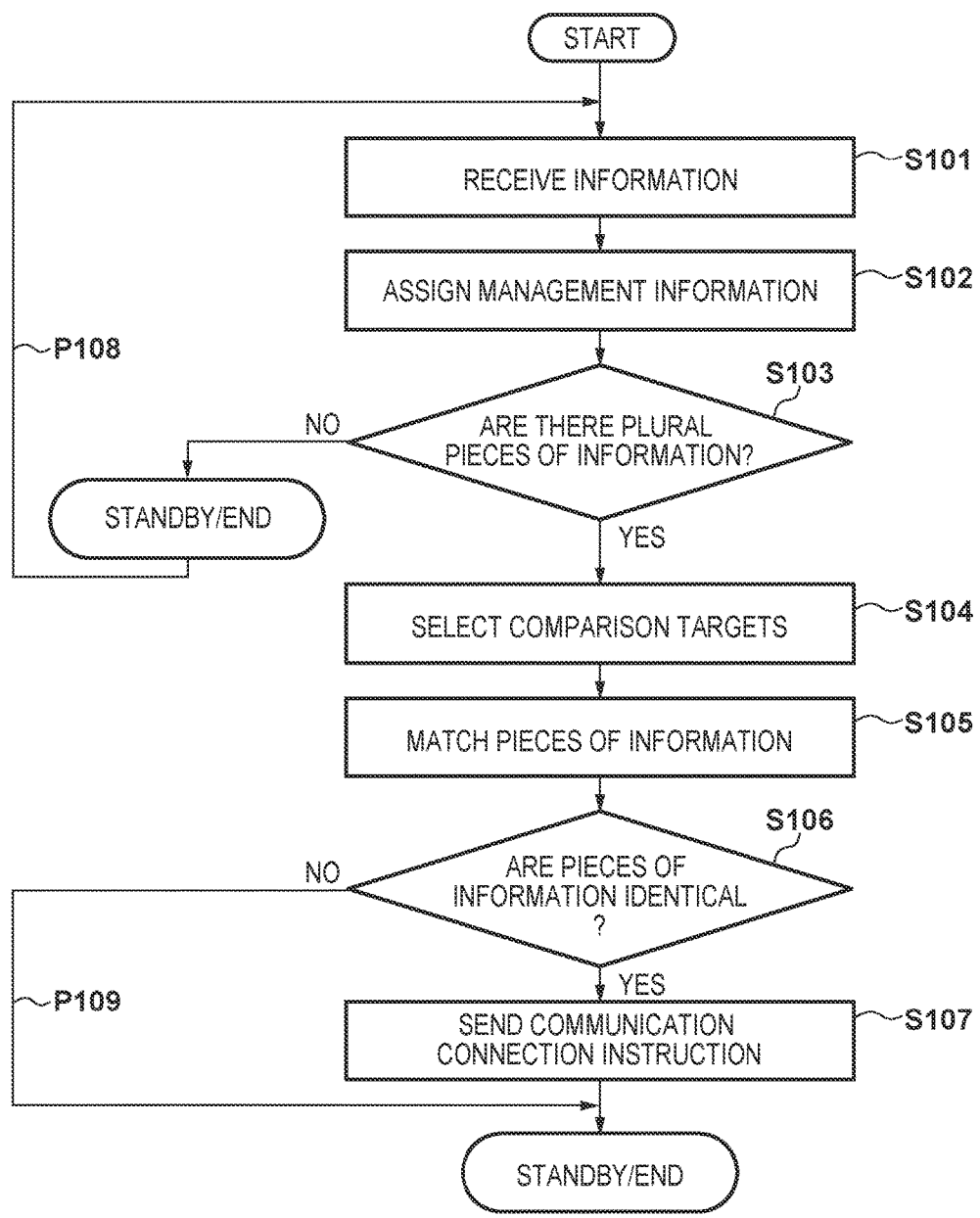
FIG. 3 is a flowchart illustrating a communication setting sequence by the control apparatus.

The present invention will be described in detail below based on arrangements and embodiments with reference to the accompanying drawings. Note that arrangements to be described in the following embodiments are merely examples, and the present invention is not limited to the illustrated arrangements.

Control Apparatus

FIG. 1A is a block diagram showing the functional arrangement of a control apparatus (to be referred to as a control apparatus 1 hereinafter) according to an embodiment to be described below. The control apparatus 1 includes an obtaining unit 2, an evaluation unit 3, and an instruction unit 4. The control apparatus 1 is not limited in terms of system arrangement requirements such as a device shape, hardware resources, and the arrangement location of software as long as the functions (to be described later) of the obtaining unit 2, evaluation unit 3, and instruction unit 4 are implemented. For example, the control apparatus 1 can be arranged on a cloud, on a server, or in each imaging device (shown in FIG. 2 and the like). The function units of the control apparatus 1 may be arranged at the same location or different locations.

If the respective function units are arranged at the same location, it is possible to shorten an information transmission distance during processing performed by the control apparatus 1, and thus an increase in execution speed can be expected. On the other hand, if the control apparatus 1 is arranged in each imaging device, the device and hardware resources are limited, and thus the processing speed of the control apparatus 1 may be limited by the hardware resource. In this case, an increase in execution speed can be expected by arranging the control apparatus 1 at a location such as a server or cloud where there are relatively plenty of hardware resources.

The obtaining unit 2 is connected to each imaging device to obtain information (to be referred to as imaging information hereinafter) imaged by the imaging device and manage the imaging information. The obtaining unit 2 can be connected to each imaging device via the Internet or using another communication method, for example, Bluetooth®, Wi-Fi, or infrared. The obtaining unit 2 may be continuously or intermittently connected to each imaging device.

The evaluation unit 3 selects, from pieces of imaging information managed by the obtaining unit 2, pieces of information to be compared, and compares and matches the selected pieces of information. Based on the result of information comparison and matching performed by the evaluation unit 3, the instruction unit 4 selects two or more imaging devices to be communicably connected to each other, and instructs the selected imaging devices to be communicably connected to each other.

In the control apparatus 1, all of the obtaining unit 2, evaluation unit 3, and instruction unit 4 may always operate, or some of the above function units may operate and the remaining function units may operate in a standby state. For example, the obtaining unit 2 always operates, and the evaluation unit 3 is activated when information is sent. In addition, the instruction unit 4 can be activated in accordance with the result of the evaluation unit 3. When the functions of the respective function units are activated, as needed, a reduction in operation cost of each function unit can be expected.

The control apparatus 1 can exist as an independent apparatus or application software. On the other hand, the control apparatus 1 can coexist with an information save unit, for example, a system such as a file server. Coexistence indicates a case in which the control apparatus 1 includes a file save unit, or a case in which the control apparatus 1 can be used as an application of the file save unit. If the control apparatus 1 coexists with some information save unit, the user of each imaging device may have a purpose of saving information or a purpose of using the functions of the control apparatus 1. The control apparatus 1 can include a switching unit having a function of allowing the user to explicitly recognize and switch the purposes so that the user can select one of the purposes. Such switching unit may be provided as, for example, application software of a user interface, and installed in the control apparatus 1 or installed as software in each imaging device. Alternatively, if the control apparatus 1 exists as application software, the switching unit can exist as a module of the application software.

Furthermore, the control apparatus 1 can include an imaging device which can obtain image data and/or video data. As the imaging device, not only a camera and video camera but also a mobile phone and smartphone each having a camera function can be used. The imaging device is not specifically limited as long as a device can be attached with an imaging function, such as a computer, printer, scanner, car navigation system, and wearable device. An imaging apparatus from which the control apparatus 1 obtains information about an object is not specifically limited as long as the imaging function is attached.

Obtaining Unit

The obtaining unit 2 obtains imaging information obtained by each imaging device, and manages the imaging information. The obtaining unit 2 will be described below with reference to FIG. 2. FIG. 2 is a view showing information transmission paths of the control apparatus 1.

The obtaining unit 2 includes an information reception unit 21 and an information management unit 22. The information reception unit 21 can be connected to each imaging device via the Internet or using another communication method. The information reception unit 21 may be continuously or intermittently connected to each imaging device. Furthermore, the number of imaging devices with which the information reception unit 21 communicates is not limited. For example, the information reception unit 21 may be connected to an imaging device 5 via a path 51, and connected to an imaging device 6 via a path 61.

If the information reception unit 21 and each imaging device are intermittently connected, connection between the information reception unit 21 and the imaging device can be started using, as a trigger, sending of a communication start signal from the imaging device to the information reception unit 21 of the control apparatus 1. This can suppress unnecessary communication, and thus the communication load reduction effect of the overall network can be expected. As the signal sent by the imaging device, for example, shutter pressing information indicating that the imaging device 5 images an object 7, the start of a live view, or the like can be used. Such signal can be implemented by installing, in the imaging device side, a connection start application to the control apparatus 1 which operates in synchronism with imaging. Alternatively, communication can be started so that the imaging device side performs connection to the control apparatus 1 at a desired timing.

The information management unit 22 manages information received by the information reception unit 21. FIG. 1B is a block diagram showing the functional arrangement of the information management unit. As shown in FIG. 1B, the information management unit 22 includes an imaging device specifying unit 22A, an attached information management unit 22B, and an information save unit 22C. The information management unit 22 manages information about the object imaged by the imaging device 5, information for specifying the imaging device, information indicating the position of the imaging device, information of an imaging time, and the like by the imaging device specifying unit 22A, attached information management unit 22B, and information save unit 22C.

For example, referring to FIG. 2, the imaging device 5 images the object 7, and the information reception unit 21 of the control apparatus 1 receives the imaging information. The imaging device specifying unit 22A assigns a management ID to the imaging information. This allows the information management unit 22 to manage the imaging information. The imaging device specifying unit 22A can associate (assign) various kinds of information as the management ID with the imaging information. For example, the imaging device specifying unit 22A obtains, from the imaging apparatus, a MAC address as information for specifying the imaging apparatus, and associates the MAC address with the imaging information.

Alternatively, the imaging device specifying unit 22A can assign an IP address to the imaging apparatus, and associate the IP address with the imaging information.

The attached information management unit 22B associates, with the management ID, meta information about the object, attached information for specifying a status at the time of imaging or after imaging, and the like. The meta information about the object can be the type of object, for example, a type such as a person, animal, or plant, the name of a book, building, or group, or the like as information usable to specify the object, but is not limited to them. Furthermore, with respect to pets such as dogs, even if the dogs are of the same breed, if there are pieces of information for specifying the dogs as individuals, these pieces of information can be used as pieces of meta information. As a method of obtaining information for specifying an individual person or pet, a social networking service may be searched within an accessible range. Obtaining such meta information is not specifically limited as long as information is obtained in accordance with the laws.

The attached information for specifying the status at the time of imaging may be, for example, attached information about the imaging device and information of a situation around the imaging device at the time of imaging. The attached information about the imaging device may be, for example, the specification information of the imaging device like a communication standard with which the imaging device complies, a focal length, aperture, shutter speed, camera angle, imaging mode, and the like at the time of imaging, and an imaging time and the like for a moving image, but is not limited to them. The attached information management unit 22B may obtain such attached information as information selected by the imaging device at the time of imaging, and associate the information with the management ID.

The information of the situation around the imaging device at the time of imaging or after imaging may be, for example, position information such as a country name, latitude, longitude, and altitude, time or time difference information, weather, the velocity of wind, temperature and humidity, acoustics, audio, and the like. Alternatively, if the imaging device itself is moving, the speed, acceleration, direction, and the like can be used, but the present invention is not limited to them. For the situation around the imaging device and the like, if sensors for measuring the above items are mounted in the imaging device, pieces of information of the sensors can be used. For example, a position at which the imaging apparatus performs imaging can be recorded as GPS information, and the information reception unit 21 can manage the GPS information by receiving the information together with the imaging information. In addition, the information reception unit 21 can manage, as management information, the time at which the imaging information is imaged, the time at which the information reception unit 21 receives the imaging information, and the like. These pieces of information are useful for the evaluation unit 3 and instruction unit 4 (both of which will be described later) to compare the pieces of information and select communication connection devices, and may thus be recorded and managed together with the information about the object.

Managed information in addition to the above pieces of information may be any information useful to specify the imaging information. The attached information management unit 22B can select and use the information, as needed, in accordance with the situation of the control apparatus 1. The imaging device specifying unit 22A and the attached information management unit 22B may be provided as application software programs of the user interface, and installed in the control apparatus 1 or installed as software programs in the imaging device. If the control apparatus 1 exists as application software, the attached information management unit 22B can exist as a module of the application software.

The above information is saved in the information save unit 22C of the information management unit 22. Note that the information management unit 22 can have a function (not shown) of deleting the management information. Since an increase in amount of information managed by the information management unit 22 may waste the capacity of the recording medium such as the memory or hard disk of the control apparatus 1, the information may be deleted, as needed. As an information deletion timing, for example, the information can be deleted by an information deletion instruction from the user, or setting can be performed to automatically delete the information after a predetermined time elapses. The method and the like are not specifically limited.

Evaluation Unit

The evaluation unit 3 includes a comparison target selection unit 31 and a matching unit 32. The evaluation unit 3 will be described below with reference to FIG. 2.

The comparison target selection unit 31 selects comparison targets based on the pieces of imaging information received by the information reception unit 21 from the imaging devices 5 and 6. For example, for selection, the comparison target selection unit 31 may compare an object video or the feature amount of the object video included in one piece of received imaging information with the other object video or the feature amount of the object video. The comparison target selection unit 31 can compare the entire object videos or parts of the object videos, for example, only regions in focus. Alternatively, the comparison target selection unit 31 may weight the comparison result of the regions in focus to perform matching result determination.

As the feature amount of the object video, for example, clothing, belongings, the color of skin, eyes, or hair, estimation of age/sex, posture, gait, or the like can be used if the object is a person. With respect to various objects such as an animal, plant, and building, the feature amount is not specifically limited as long as it is possible to specify the object.

When selecting comparison targets, the comparison target selection unit 31 can efficiently select comparison targets using the pieces of information of the positions and times of the imaging devices 5 and 6 managed by the information management unit 22. As a method of using these pieces of information, for example, the comparison target selection unit 31 can set, as its initial settings, to select comparison targets for each of which the imaging time falls within a predetermined time and the GPS information falls within a predetermined range. Alternatively, when the control apparatus receives the information, the comparison target selection unit 31 can instruct the corresponding imaging device to input setting information so that the user can set a desired time and position with respect to comparison target selection. Furthermore, the comparison target selection unit 31 may include a search unit. If the comparison target selection unit 31 includes the search unit, it can make selection to compare the object information with information on the Internet obtained via the information reception unit 21. This can select comparison targets to compare the pieces of meta information after obtaining the meta information of each piece of object information. Note that the evaluation unit 3 can have an arrangement without the comparison target selection unit 31.

The matching unit 32 matches the comparison targets selected by the comparison target selection unit 31, and evaluates the relationship between them, thereby outputting an evaluation result. If the comparison target selection unit 31 selects two object videos as comparison targets, the matching unit 32 compares them using an object video recognition technique, and evaluates the similarity, that is, the relationship between objects. The type of video recognition technique is not specifically limited as long as it can correctly compare the object videos. With respect to the similarity determined by the matching unit 32, it may be determined that the objects strictly match or that objects almost match. The threshold of the similarity for determining that the pieces of information are identical can be determined as an initial setting. Alternatively, the threshold is appropriately determined in accordance with the type of information undergoing matching by the matching unit 32, elements used by the comparison target selection unit 31 to select comparison targets, and the desire of the user of each imaging device, and the timing and threshold to be set are not specifically limited. For example, if the objects imaged by the users of the imaging devices are special and have been imaged at the same position, even if the similarity does not indicate a strict match, it can be determined that the same object has been imaged.

If the comparison target selection unit 31 selects pieces of meta information as comparison targets, it is possible to control strictness of information matching. As an example in which practical use of meta information is effective, a case in which the user wants to recognize, as an object, a group including different members who perform in, for example, a concert of an idle group is considered. In this case, it can be expected to produce an effect in which the matching unit 32 can recognize objects as identical objects even if different members perform, an arrangement on a stage is changed, or costumes are changed depending on songs.

The number of elements used for similarity evaluation is not necessarily limited to one, and a plurality of elements may be used. If a plurality of elements are used, the matching unit 32 may change a weight for each element when setting a similarity threshold. As a method of determining a similarity threshold, application software which allows the user of the control apparatus 1 to manually input a similarity threshold or application software which automatically determines an appropriate similarity threshold in accordance with the information selected by the comparison target selection unit 31 may be included. These methods may be used in combination.

Instruction Unit

The instruction unit 4 includes a communication connection device selection unit 41 and a communication connection instruction unit 42. The instruction unit 4 will be described below with reference to FIG. 2.

The communication connection device selection unit 41 selects communication connection devices based on the matching result of the matching unit 32. For example, referring to FIG. 2, the matching unit 32 matches the pieces of object information which are respectively obtained when the imaging devices 5 and 6 image the object 7, and it is determined that pieces of information included in the pieces of object information indicate the same object 7. Based on the result, the communication connection device selection unit 41 selects the imaging devices 5 and 6 from the pieces of information managed by the information management unit 22, and selects the two imaging devices as connection devices.

The thus selected connection devices are recognized by the information management unit 22 as a connection device group, and managed by assigning a connection device group ID. After the imaging devices 5 and 6 are managed as a group of communication connection devices, and assigned with the group ID, as described above, an imaging device 8 may image the object 7 and thus enter the same group. In this case, the same processing as that performed when the imaging devices 5 and 6 are selected as the connection device group is executed. That is, the matching unit 32 compares and matches object information imaged by the imaging device 8 with one or both of the object information imaged by the imaging device 5 and that imaged by the imaging device 6. As a result, it is determined that the object information imaged by the imaging device 8 indicates the same object 7. In this case, the group ID assigned to the imaging devices 5 and 6 is assigned to the imaging device 8, and the imaging devices 5, 6, and 8 are managed as the same group.

As described above, an imaging device may be added to the same group later, resulting in an increase in the number of imaging devices to be communicably connected. Conversely, a specific imaging device may disconnect the communication connection, resulting in a decrease in the number of imaging devices belonging to the connection group. As described above, if three or more imaging devices form a communication connection group, communication in the group can be facilitated by registering the communication connection group at a multicast address given by the communication connection instruction unit 42 (to be described later). Although multicasting assumes the IP level, the present invention is not limited to this, and a server application may perform multicasting.

The communication connection instruction unit 42 sends a communication connection instruction to each of the imaging devices selected by the communication connection device selection unit 41. Sending the communication connection instruction includes, for example, notifying the imaging devices that they are connectable by sending information for specifying the devices to be connected, information of the communication standards of the devices to be connected, and the like to the imaging device 5 via a path 52 and to the imaging device 6 via a path 62. This allows the imaging devices 5 and 6 selected as connection devices to start direct communication connection using their communication standards. Alternatively, the communication connection instruction unit 42 can notify the imaging devices that they are communicable by sending the connection device group ID managed by the information management unit 22 to each of the imaging devices 5 and 6, thereby instructing communication connection. In this case, the imaging devices 5 and 6 can start direct communication connection.

The imaging devices 5 and 6 can be communicably connected via the control apparatus 1. In this case, the imaging devices can be temporarily, communicably connected as a connection group without sharing the pieces of unique information of the imaging devices, or can communicate with each other even if they do not comply with the common communication standard for allowing direct communication. Furthermore, the communication connection instruction unit 42 can instruct the imaging devices included in the connection group selected by the communication connection device selection unit 41 to determine whether connection is possible. This can eliminate the risk of automatically setting communication connection when an imaging device is erroneously recognized as a connection group, thereby enhancing the security.

When instructing communication connection, an instruction is sent to each of the imaging devices 5 and 6 by pressing a predetermined button of the control apparatus 1. Alternatively, selection of the imaging devices 5 and 6 as the connection group may be used as an instruction sending trigger. The method of sending an instruction is not specifically limited. This allows the imaging devices 5 and 6 to start a wireless setup and communicate with each other. If the imaging devices 5 and 6 are already connected to each other, an instruction to cancel filtering of the MAC address and IP address of the imaging device 6 may be sent to the imaging device 5, and an instruction to cancel filtering of the imaging device 5 may be sent to the imaging device 6. This allows the imaging devices 5 and 6 to cancel filtering and communicate with each other. The example in which the imaging devices 5 and 6 are directly connected to each other has been explained. However, the present invention is not limited to this. The communication connection instruction unit 42 may transmit parameters used by the imaging devices 5 and 6 for connection to the same access point and identifiers with which the imaging devices 5 and 6 can discover each other on the access point, and send a connection start instruction. As described above, with respect to connection between the devices according to this embodiment, the communication connection method is not limited.

Imaging

In the present invention, imaging includes not only an operation of recording a still image or moving image but also an operation of displaying a live view to confirm a still image or moving image in real time without recording it.

Communication Setting Operation

A communication setting operation sequence between a plurality of devices which is performed by the control apparatus 1 will be described with reference to FIGS. 2 to 6. FIG. 3 shows a communication setting processing sequence by the control apparatus 1. Referring to FIG. 3, the control apparatus 1 receives imaging information from each imaging device (step S101), and assigns management information (for example, the above management ID) to the received imaging information (step S102). The control apparatus 1 searches whether there are a plurality of pieces of management information (step S103). If there are no plurality of pieces of management information, the control apparatus 1 stands by (path P108) until it obtains information to be compared; otherwise, the control apparatus 1 selects comparison targets (step S104).

Figure 4:
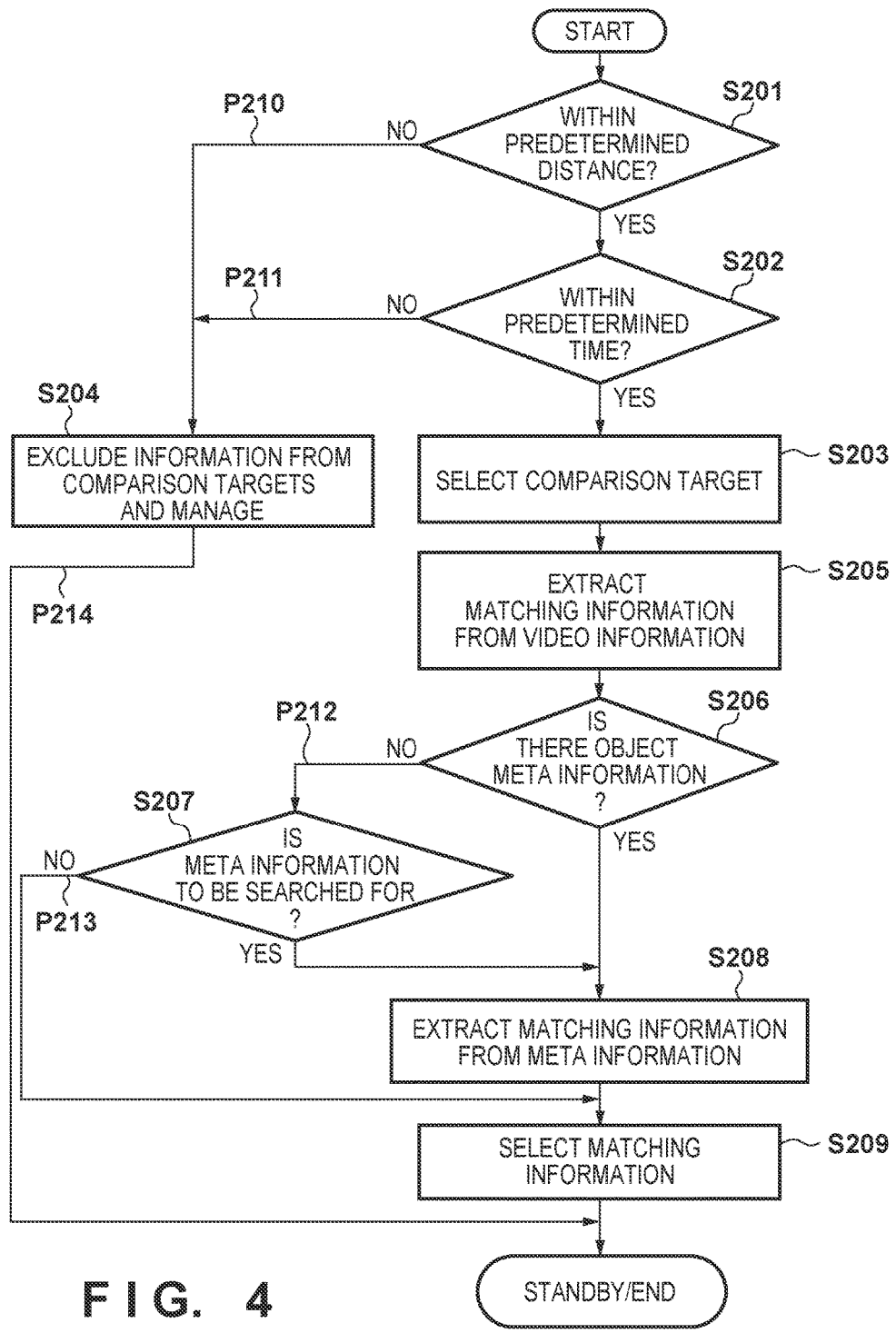
FIG. 4 is a flowchart illustrating a comparison target selection sequence by the control apparatus.

FIG. 4 shows a comparison target selection processing sequence in step S104. Referring to FIG. 4, upon start of selection of comparison targets, the control apparatus 1 determines whether the imaging (generation) position of the received imaging information falls within a predetermined distance (step S201). Subsequently, the control apparatus 1 determines whether the imaging (generation) time of the received information falls within a predetermined time (step S202). Based on the determination results, the control apparatus 1 selects, as a comparison target, the imaging information within the predetermined distance and predetermined time (step S203). If the control apparatus 1 determines in step S201 or S202 that the received imaging information falls outside the predetermined distance or time, the determined imaging information is excluded from comparison targets and managed (step S204) (path P210 or P211).

As described above, by selecting a comparison target using the distance and time, it can be expected to shorten the time for selecting comparison target candidates when a number of comparison target candidates exist. Note that the predetermined distance and predetermined time are used as pieces of information to select comparison targets in this example. These pieces of information need not be used, and if they are used, they can be used in any order. The present invention is not limited to these pieces of information, and any information usable to select comparison targets can be used, and a selection sequence based on the information can be incorporated, as needed.

If all the pieces of imaging information are excluded from comparison targets and managed (step S204) with respect to all combinations of the pieces of information managed by the control apparatus 1, the comparison target selection unit 31 stands by or ends (path P214). If there is information selected as a comparison target with respect to any one of combinations of the pieces of information (step S203), the comparison target selection unit 31 subsequently executes a step (step S205) of extracting matching information from the video information selected as a comparison target.

If the control apparatus 1 receives new information in any step of this sequence, the control apparatus 1 may use, as a comparison target candidate with the newly received information, not only the information selected as a comparison target (step S203) but also information excluded from comparison targets and managed (step S204). Furthermore, the control apparatus 1 can extract matching information from object meta information included in the selected comparison target information. The comparison target selection unit 31 determines the presence/absence of object meta information (step S206). If there is the object meta information, the comparison target selection unit 31 extracts matching information from the object meta information (step S208); otherwise (path P212), the search unit (not shown) of the comparison target selection unit 31 can search for the object meta information via the Internet and obtain it (step S207), and then extract the information as matching information (step S208).

If the meta information is not searched for (path P213), the control apparatus 1 can use, as matching information, only the video information extracted in step S205. The comparison target selection unit 31 selects matching information (step S209) from matching information extracted from the video information (step S205) and matching information extracted from the meta information (step S208), and the matching unit uses the pieces of selected information for matching. The extracted matching information may be one or both of the video information and the meta information. In this flowchart, the matching information is extracted from the meta information (step S208) after the step of extracting the matching information from the video information (step S205). The steps may be performed in any order, or performed at the same time. The comparison target selection unit 31 (FIG. 2) selects the matching information, and then stands by or ends.

Figure 5:
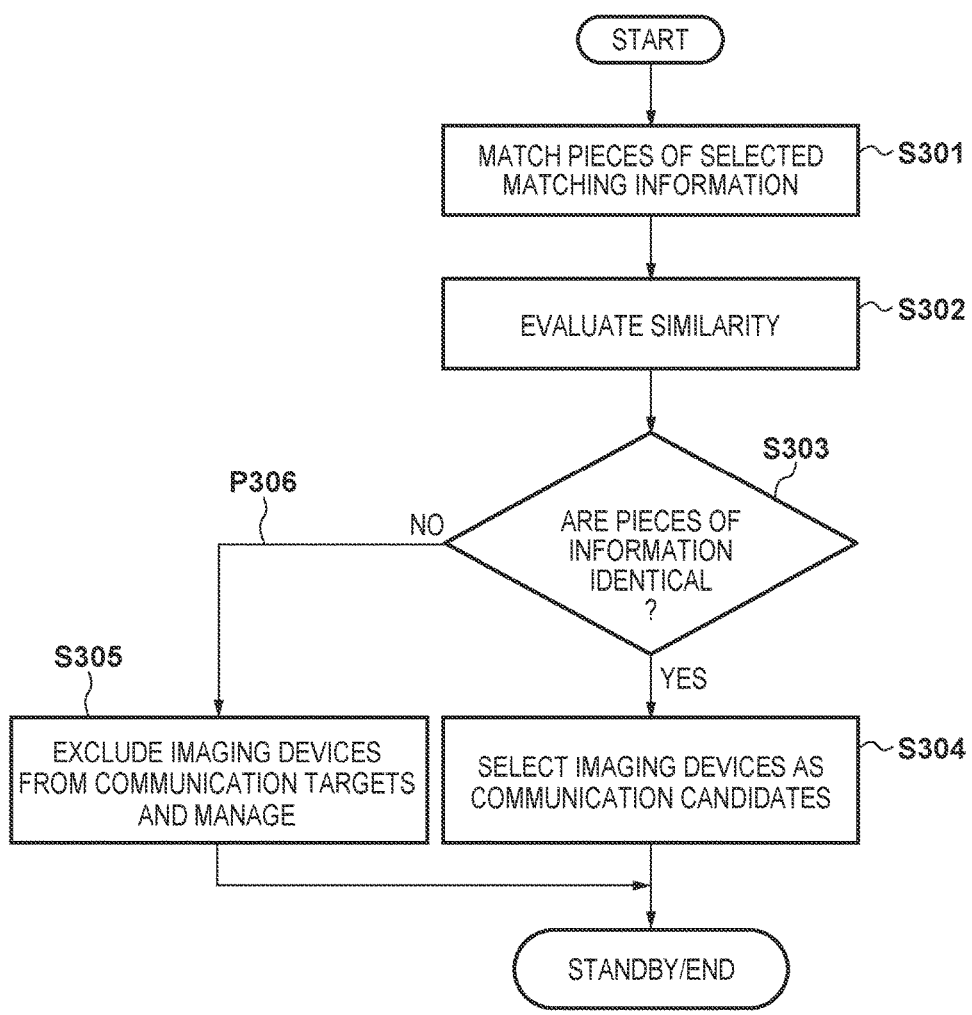
FIG. 5 is a flowchart illustrating a communication connection device selection sequence by the control apparatus.

Subsequently, the matching unit 32 matches the pieces of comparison target information (step S105 (FIG. 3)) using the pieces of selected matching information, and evaluates the similarity (relationship) between the pieces of information (step S106 (FIG. 3)). FIG. 5 shows a processing sequence of information matching in step S105 and information similarity evaluation in step S106.

Referring to FIG. 5, upon start of matching, the pieces of matching information selected by the matching unit 32 are matched (step S301), and the similarity between the matched pieces of information is evaluated (step S302). By evaluating the similarity and comparing it with the set threshold for similarity evaluation, it is determined whether the pieces of matching information are identical (step S303). If the matching unit 32 determines that the pieces of matching information are identical, the communication connection device selection unit 41 selects, as communication candidates, the imaging devices which have imaged the matched pieces of information (step S304). On the other hand, if the matching unit 32 does not determine that the pieces of matching information are identical (path P306), the imaging devices are excluded from communication targets and managed (step S305). As described above, the matching unit 32 matches the pieces of matching information, and stands by or ends after the communication connection device selection unit 41 selects imaging devices as communication connection candidates. If all the imaging devices are excluded from communication targets and managed (step S305) with respect to all combinations of the pieces of information managed by the control apparatus 1, the matching unit 32 and communication connection device selection unit 41 stand by or end.

Figure 6:
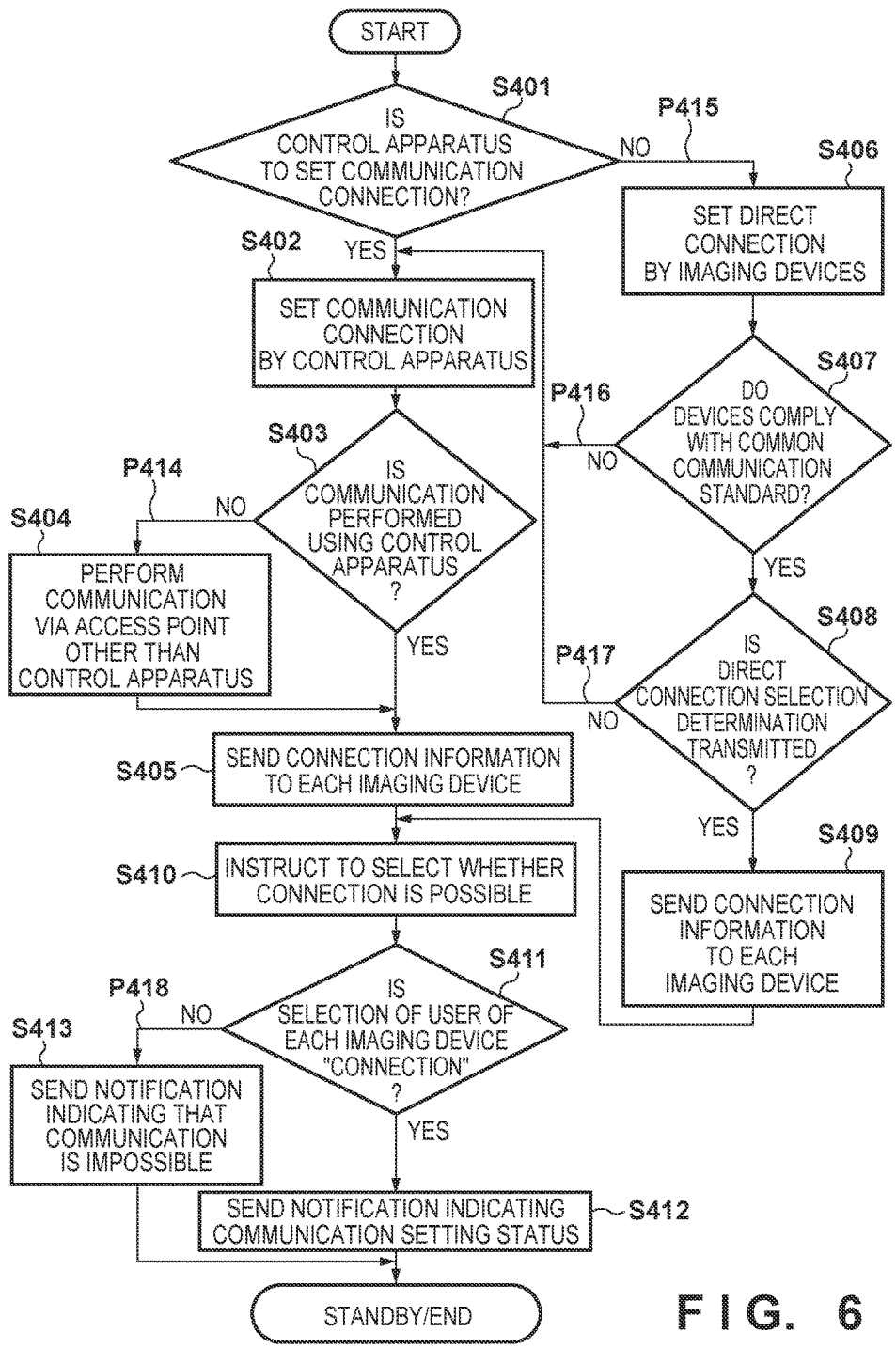
FIG. 6 is a flowchart illustrating a communication connection instruction sequence by the control apparatus.

If it is determined that the pieces of matching information are identical (YES in step S106), the control apparatus 1 sends a communication connection instruction to each of all the imaging devices selected as communication candidates (step S107 (FIG. 3)). FIG. 6 shows a communication connection instruction processing sequence in step S107. Referring to FIG. 6, when starting a communication connection instruction, the control apparatus 1 may set communication connection (step S402) or the imaging devices to each of which the communication connection instruction is sent may set direct communication connection (step S406). One of these options is appropriately selected based on whether the control apparatus 1 is an apparatus outside the imaging devices on the server or cloud or an apparatus incorporated in each imaging device. Alternatively, one of these options may be appropriately selected in accordance with the combination of communication intensities or the combination of communication standards with which the imaging devices as communication connection candidates comply. It is first determined whether the control apparatus 1 sets communication connection (step S401). The communication connection instruction unit (FIG. 2) can set the initial setting in step S401 so that the control apparatus 1 sets communication connection or the user of each imaging device performs selection every time.

A case in which the control apparatus 1 sets communication connection (step S402) will be described. In this case, there are a case in which communication is performed via the control apparatus 1 and a case (step S404) in which the imaging devices communicate with each other via an external access point other than the control apparatus 1. The communication connection instruction unit 42 can perform determination in step S403. One of these cases is appropriately selected based on whether the control apparatus 1 is an apparatus outside the imaging devices on the server or cloud or an apparatus incorporated in each imaging device. Alternatively, one of these cases may be appropriately selected based on the combination of the communication intensities or the combination of the communication standards with which the imaging devices as communication connection candidates comply. The communication connection instruction unit 42 can set, in step S403, the initial setting so that communication connection is performed via the control apparatus 1 or the user performs selection by comparing the communication intensities every time.

If communication connection between the imaging devices is performed via the control apparatus 1, the communication connection instruction unit 42 sends connection information to each of the imaging devices by transmitting, to the imaging devices for which communication connection is set, identifiers with which the imaging devices can discover each other (step S405). The communication connection instruction unit 42 instructs each imaging device to select whether connection is possible (step S410). This connection avoidance selection instruction can avoid unnecessary connection but is not essential.

If the imaging devices communicate with each other via the access point other than the control apparatus 1 (path P414, step S404), the communication connection instruction unit 42 sends a connection start instruction by transmitting the parameters for connection to the same access point and the identifiers with which the imaging devices can discover each other on the same access point (step S405). The control apparatus 1 can calculate the degree of congestion of a line, the distance between the imaging devices, and the like, and select an appropriate access point as an access point as a connection destination. As described above, if the control apparatus 1 sets communication connection (step S402), it is not essential that the imaging devices to be connected to each other share pieces of information for specifying them. This allows the imaging devices to be connected to each other without sharing the pieces of information (IP addresses, mail addresses, or the like) for specifying them even if they want to be communicably connected to each other on the spot.

As a case in which the control apparatus 1 sets no communication connection (path P415), for example, a case in which one of the users of the imaging devices selects direct communication will be described. If the imaging devices set direct connection (step S406), the control apparatus 1 searches, based on the management information, for information of the communication standard with which each imaging device complies, and determines whether the imaging devices which set communication connection comply with the common communication standard (step S407). If the imaging devices which set communication connection comply with the common communication standard, the communication connection instruction unit 42 can transmit direct connection selection determination to each imaging device (step S408). If all the users of the imaging devices as communication connection candidates select to perform direct connection, the communication connection instruction unit 42 sends, to each imaging device, information (MAC address, IP address, or the like) unique to the imaging device as connection information and information of the common communication standard. The common communication standard compliance confirmation step (step S407) and the direct connection selection determination step (step S408) are not essential, and the communication connection instruction unit 42 may send the connection information to each imaging device (step S409), and only send the address information of the connection destinations as communication connection setting candidates to each imaging device.

On the other hand, if the imaging devices do not comply with the common communication standard (path P416) or if one of the users of the imaging devices decides not to perform direct connection in the direct connection selection determination step (path P417), communication connection can be set in the above-described step (step S402) in which the control apparatus 1 sets communication connection.

After or while the control apparatus 1 sends the connection information to each imaging device (step S405 or S409), the communication connection instruction unit 42 can instruct each imaging device to select whether connection is possible (step S410). In this case, if the user of each imaging device selects to perform communication connection to the sent connection destination (YES in step S411), the communication connection instruction unit 42 sends a notification indicating a communication setting status (step S412). For example, if the control apparatus 1 sets communication connection (step S402), the communication connection instruction unit 42 can send, as the communication setting status, a notification indicating a state in which communication setting is complete and communication is possible. Alternatively, a notification indicating that communication connection setting is in progress or a notification indicating the degree of congestion of the line may be sent as the communication setting status. On the other hand, if the imaging devices set direct connection (step S406), information indicating that the imaging devices desire connection and an instruction to start a communication connection setting operation is sent as the communication setting status.

On the other hand, if it is determined in step S411 that the user of each imaging device selects not to perform communication connection (path P418), the communication connection instruction unit 42 notifies other imaging devices as connection candidates of information indicating that communication is impossible (step S413). As a method of sending the above information to all the imaging devices as communication connection candidates, the communication connection instruction unit 42 may unicast or multicast the information by designating the IP addresses or the like of the imaging devices. The communication connection instruction unit 42 may send the information to each imaging device or send the information to all the imaging devices at once. After sending the communication connection instruction, the communication connection instruction unit 42 stands by or ends.

Even while the control apparatus 1 performs one of the processes in steps S101 to S107 of FIG. 3 for the received information, the control apparatus 1 may receive new information (step S101). In this case, the control apparatus 1 can perform the processes in steps S101 to S107 for the newly received information. The control apparatus 1 may perform the processing for the newly received information after or before the end of the preceding processing or simultaneously with the preceding processing. The processing in which the control apparatus 1 stands by is not specifically limited.

After the communication connection instruction is received from the control apparatus 1 and the imaging devices perform communication connection, the users of the imaging devices can share desired information. At this time, by limiting in advance, for each imaging device, the range of information to be shared, the users can share information without sharing unnecessary information.

Figure 7:
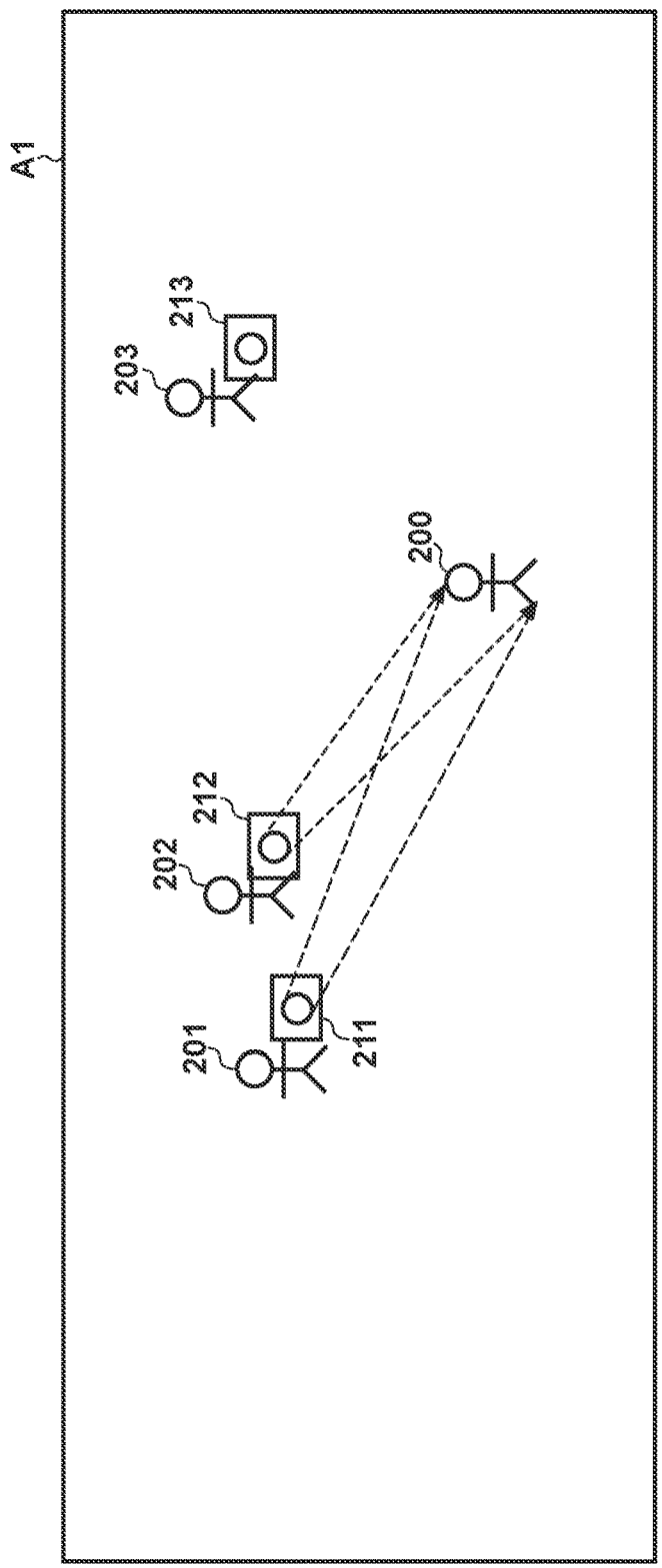
FIG. 7 is a schematic view showing a status according to the first embodiment.
Figure 8:
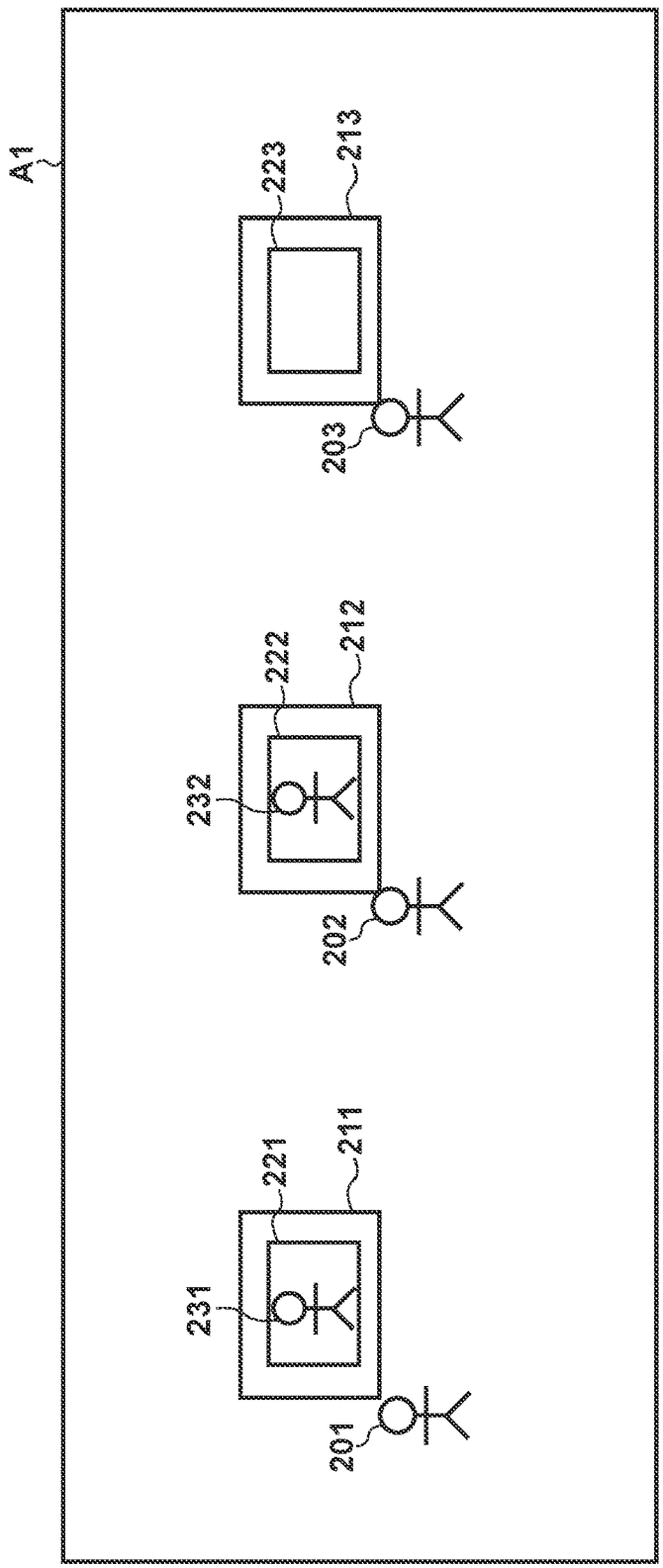
FIG. 8 is a schematic view showing a communication connection setting status according to the first embodiment.
Figure 9:
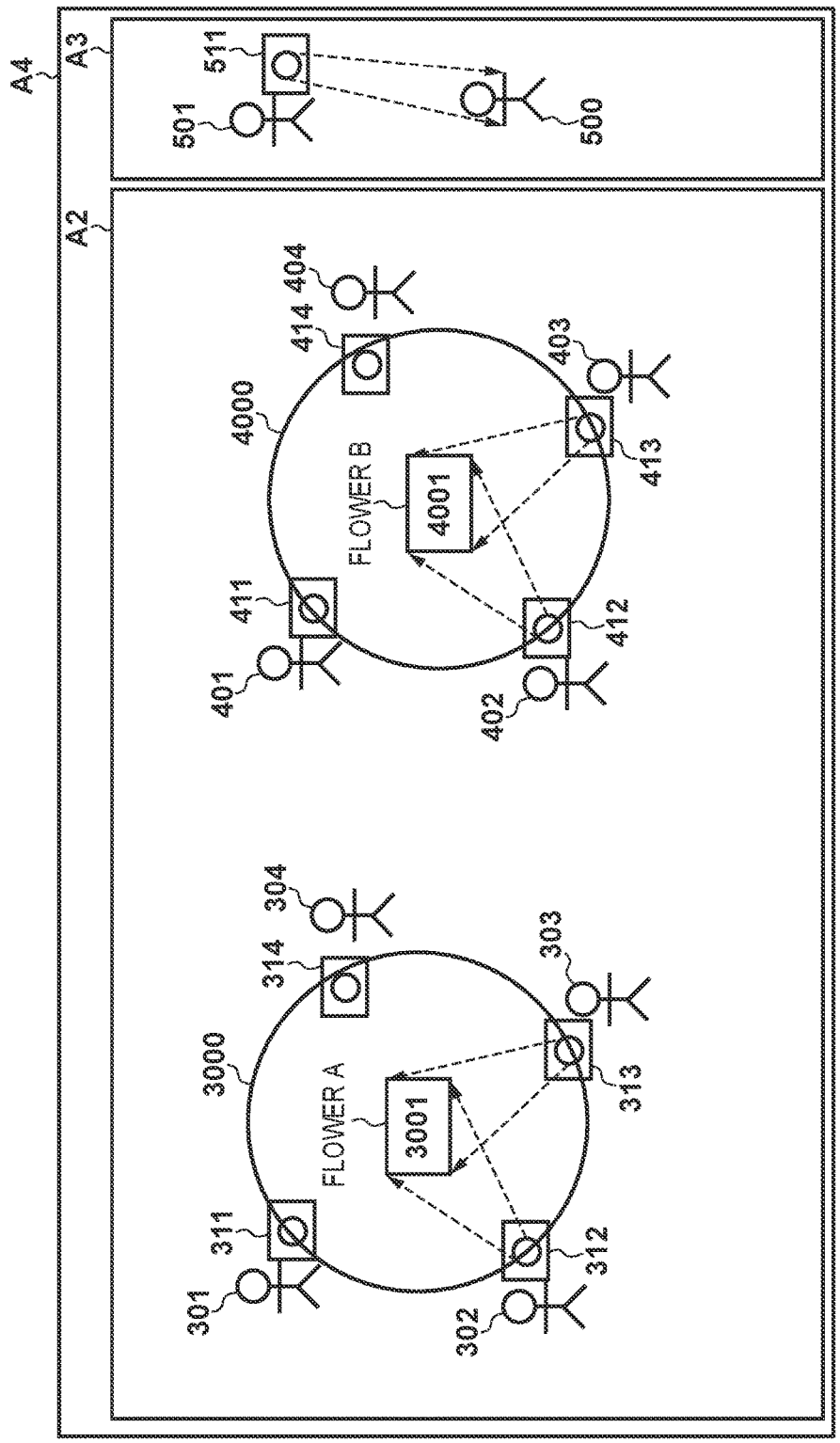
FIG. 9 is a schematic view showing a status according to the second embodiment.
Figure 10:
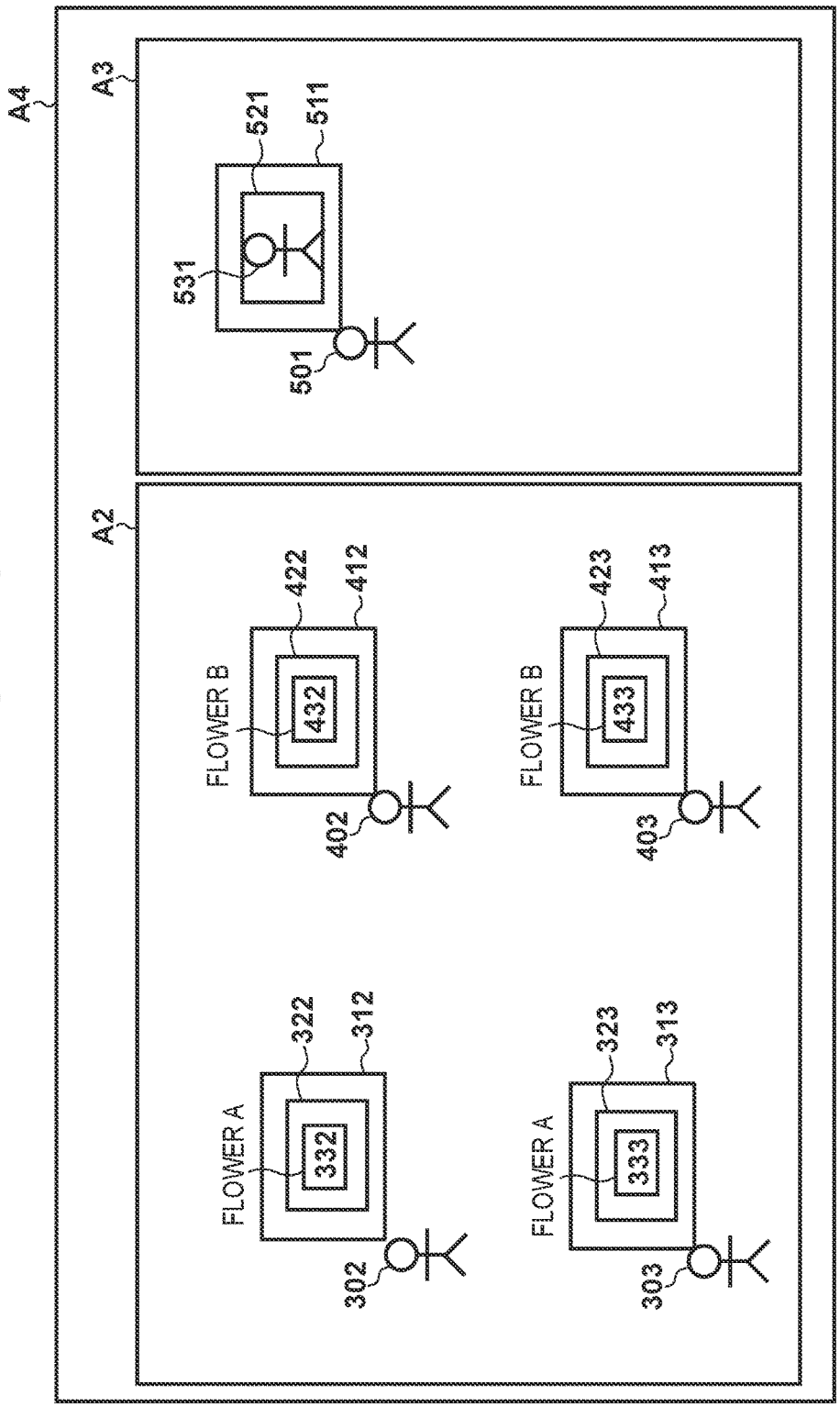
FIG. 10 is a schematic view showing a communication connection setting status according to the second embodiment.

Embodiments of the present invention will be described with reference to FIGS. 7 to 11. FIG. 7 is a schematic view showing a status according to the first embodiment. FIG. 8 is a schematic view showing a communication connection setting status according to the first embodiment. FIG. 9 is a schematic view showing a status according to the second embodiment. FIGS. 10 and 11 are schematic views each showing a communication connection setting status according to the second embodiment.

First Embodiment: Communication Connection Setting

The first embodiment will be described below with reference to FIGS. 1, 7, and 8. This embodiment will consider a case in which communication connection is set between a digital camera 211 and a smartphone 212 in a space A1 where the digital camera 211, the smartphone 212, and a digital camera 213 exist (FIG. 7). Assume that the respective imaging devices (digital camera 211, smartphone 212, and digital camera 213) are continuously connected to a control apparatus 1 according to the present invention via the Internet.

Referring to FIG. 7, persons 201, 202, and 203 hold the digital camera 211, smartphone 212, and digital camera 213, respectively. The persons 201 and 202 image a person 200 using the digital camera 211 and smartphone 212, respectively. On the other hand, the person 203 does not image the person 200 using the digital camera 213. In this case, as shown in FIG. 8, images of the person 200 are displayed as pieces 231 and 232 of video information on liquid crystal screens 221 and 222 of the digital camera 211 and smartphone 212, respectively. On the other hand, no image of the person 200 is displayed on a liquid crystal screen 223 of the digital camera 213. When the digital camera 211 images the person 200, the control apparatus 1 receives the video information 231. When the smartphone 212 images the person 200, the control apparatus 1 receives the video information 232.

In the control apparatus 1, an imaging device specifying unit 22A of an information management unit 22 associates the video information 231 with information of an IP address assigned to the digital camera 211, and assigns an ID 241 as a management ID to save the information in an information save unit 22C of the information management unit 22. The imaging device specifying unit 22A also associates the video information 232 with information of an IP address assigned to the smartphone 212, and assigns an ID 242 as a management ID to save the information in the information save unit 22C. Subsequently, a comparison target selection unit 31 selects the IDs 241 and 242, and a matching unit 32 matches the pieces 231 and 232 of video information. The matching unit 32 determines that the videos of the person 200 are included in the pieces 231 and 232 of video information, respectively, and the same person has been imaged.

Based on the result of the matching unit 32, a communication connection device selection unit 41 selects, as imaging devices which are to be communicably connected, the digital camera 211 and smartphone 212 respectively linked with the IDs 241 and 242. After that, a communication connection instruction unit 42 associates the IP addresses of the digital camera 211 and smartphone 212 with each other, and creates a communication protocol for transmitting, to one another, the pieces of information transmitted from the digital camera 211 and smartphone 212. The communication connection instruction unit 42 can transmit, to the digital camera 211 and smartphone 212, information indicating that the communication protocol has been created and communication can be performed via the control apparatus 1, thereby sending a communication connection instruction. As a result, the digital camera 211 and the smartphone 212 can share, via the control apparatus 1, necessary information, for example, information such as photos, text, and the like to be shared, and the persons 201 and 202 can share their pieces of information.

Second Embodiment: Communication Connection Setting Between Plural Groups

The second embodiment will be described below with reference to FIGS. 1, 9, 10, and 11. This embodiment will consider a case wherein when a space A4 including two spaces A2 and A3 of different places exists, as shown in FIG. 9, a plurality of groups for which communication connection is set are created in the space A2. The spaces A2 and A3 exist at places which are away from each other to the extent that they have different pieces of GPS information. For example, assume that the spaces A2 and A3 are 100 km or more away from each other. For example, the space A4 corresponds to the whole of Japan, the space A2 corresponds to Osaka, and the space A3 corresponds to Tokyo. The respective regions are not specifically limited to them. Assume that a control apparatus 1 is on a cloud in the space A4, and respective imaging devices in the respective spaces are continuously connected to the control apparatus 1 via the Internet.

In the space A2, persons 301, 302, 303, and 304 have digital cameras 311, 312, 313, and 314, respectively. In addition, persons 401, 402, 403, and 404 have digital cameras 411, 412, 413, and 414, respectively. Assume that the persons 301, 302, 303, and 304 sit around a table 3000, and the persons 401, 402, 403, and 404 sit around a table 4000. A flower A 3001 and flower B 4001 are arranged on the tables 3000 and 4000, respectively. On the other hand, in the space A3, persons 500 and 501 exist and the person 501 has a digital camera 511.

In the space A2, the persons 302 and 303 image the flower A 3001 on the table 3000 using their digital cameras 312 and 313, respectively. On the other hand, the persons 402 and 403 image the flower B 4001 on the table 4000 using their digital cameras 412 and 413, respectively. In this case, as shown in the space A2 of FIG. 10, images of the flower A 3001 are displayed as pieces 332 and 333 of video information on liquid crystal screens 322 and 323 of the digital cameras 312 and 313, respectively. On the other hand, images of the flower B 4001 are displayed as pieces 432 and 433 of video information on liquid crystal screens 422 and 423 of the digital cameras 412 and 413, respectively.

On the other hand, in the space A3, the person 501 images the person 500 as a friend using the digital camera 511. In this case, as shown in the space A3 of FIG. 10, an image of the person 500 is displayed as video information 531 on a liquid crystal screen 521 of the digital camera 511.

The control apparatus 1 receives the video information 332 when the digital camera 312 images the flower A 3001 in the space A2, and receives the video information 333 when the digital camera 313 images the flower A 3001. Similarly, the control apparatus 1 receives the video information 432 when the digital camera 412 images the flower B 4001, and receives the video information 433 when the digital camera 413 images the flower B 4001. Furthermore, the control apparatus 1 receives the video information 531 when the digital camera 511 images the person 500 in the space A3. When receiving the video information from each digital camera, the control apparatus 1 also obtains the time at which the digital camera performs imaging, and the GPS information of the digital camera. The GPS information is represented by GPS2 for the space A2 or GPS3 for the space A3. As described above, the control apparatus 1 obtains information when each digital camera performs imaging. However, the imaging order of the respective digital cameras is not limited to the above one, and any order may be adopted. In this embodiment, assume that the respective imaging operations are performed at almost the same time.

In the control apparatus 1, an imaging device specifying unit 22A of an information management unit 22 associates the video information 332, GPS2, and imaging time information with information of an IP address assigned to the digital camera 312, and assigns an ID 342 as a management ID to save the information in an information save unit 22C of the information management unit 22 (FIG. 11). Similarly, the imaging device specifying unit 22A associates the video information, GPS information, and time information with information of an IP address assigned to another digital camera, and assigns a management ID. The imaging device specifying unit 22A associates the video information 333, GPS2, and imaging time information with information of an IP address assigned to the digital camera 313, and assigns an ID 343 as a management ID to save the information in the information save unit 22C. The imaging device specifying unit 22A associates the video information 432, GPS2, and imaging time information with information of an IP address assigned to the digital camera 412, and assigns an ID 442 as a management ID to save the information in the information save unit 22C. The imaging device specifying unit 22A associates the video information 433, GPS2, and imaging time information with information of an IP address assigned to the digital camera 413, and assigns an ID 443 as a management ID to save the information in the information save unit 22C. The imaging device specifying unit 22A associates the video information 531, GPS3, and imaging time information with information of an IP address assigned to the digital camera 511, and assigns an ID 541 as a management ID to save the information in the information save unit 22C. As a result, the information management unit 22 manages the five pieces of information of the management IDs 342, 343, 442, 443, and 541.

Subsequently, a comparison target selection unit 31 selects pieces of information to be compared from the pieces of information saved in the information save unit 22C of the information management unit 22. In this embodiment, as initial settings, information whose imaging time falls within one hour and whose GPS information falls within a range of 10-km radius is selected as a comparison target. If the comparison target selection unit 31 uses the time and position information as comparison target selection information, the time and position information may be simultaneously or sequentially used, and their use order is not specifically limited.

The comparison target selection unit 31 compares the pieces of time information based on the five management IDs managed by the information management unit 22 of the control apparatus 1. Since all the pieces of ID information indicate almost the same time and fall within one hour, the five management IDs are maintained as comparison target candidates. Subsequently, the comparison target selection unit 31 compares the pieces of position information of the respective management IDs, and confirms that the management IDs 342, 343, 442, and 443 each have information of GPS2, and the management ID 541 has information of GPS3. As a result, the management IDs 342, 343, 442, and 443 are extracted as the first group of comparison target candidates, and the management ID 541 is extracted as the second group.

A matching unit 32 compares the pieces of video information of the four management IDs extracted as the first group. The matching unit 32 matches the videos of the management IDs 342, 343, 442, and 443. The matching unit 32 recognizes that the pieces 332 and 333 of video information of the management IDs 342 and 343 indicate the flower A 3001. On the other hand, the matching unit 32 recognizes that the pieces 432 and 433 of video information of the management IDs 442 and 443 indicate the flower B 4001. The matching method of the matching unit 32, for example, compares the video information 332 of the management ID 342 with the video information 333 of the other management ID 343, and recognizes that the pieces of video information are identical. The matching unit 32 sequentially matches the video information 332 with the pieces 432 and 433 of video information of the management IDs 442 and 443, and recognizes that they indicate the different flowers. As a result, the matching unit 32 recognizes the management IDs 342 and 343 as the same group, and assigns a group ID (ID_GA). Since the management IDs 442 and 443 are not assigned to the group, the matching unit 32 determines whether they are in the same group.

Similarly, since the video information 432 of the management ID 442 matches the video information 433 of the management ID 443, and they indicate the same flower B 4001, the matching unit 32 recognizes the management IDs as the same group, and assigns a group ID (ID_GB). As a result, groups ID_GA and ID_GB are created and managed. An algorithm and order of matching the pieces of video information are appropriately selected in accordance with the speed of calculation processing and the recognition accuracy, and are not specifically limited. On the other hand, since there is no input from another imaging device within one hour, the management ID 541 extracted as the second group will not undergo subsequent comparison by determining that there is no comparison target candidate.

Based on the result of the matching unit 32, a communication connection device selection unit 41 of an instruction unit 4 selects the digital cameras 312 and 313 of the group ID_GA as imaging devices to be communicably connected to each other. The communication connection device selection unit 41 also selects the digital cameras 412 and 413 of the group ID_GB as imaging devices to be communicably connected to each other. After that, a communication connection instruction unit 42 sends information of the group ID_GA to each of the digital cameras 312 and 313, thereby sending a communication connection instruction.

Since the group ID_GA has information of the IP addresses set in the digital cameras, the digital cameras can be communicably connected to each other by designating the IP addresses. Similarly, information of the group ID_GB is sent to each of the digital cameras 412 and 413, thereby sending a communication connection instruction. As a result, it is possible to readily create a plurality of independent communication groups for the plurality of digital cameras in the space A2. The digital camera 312 can communicate with the digital camera 313 and the digital camera 412 can communicate with the digital camera 413. Consequently, the persons 302 and 303 as the owners of the digital cameras can share information, and the persons 402 and 403 can share information.

According to the above-described embodiments, the relationship between object vides each included in imaging information generated when an imaging device images an object is evaluated and, as a result of the evaluation, imaging devices which have respectively provided pieces of imaging information including object videos having a close relationship are connected. This allows devices which respectively provide pieces of imaging information having a close relationship to share images without increasing the complexity of a user operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-116023, filed Jun. 8, 2015, which is hereby incorporated by reference herein in its entirety.

What is claimed is:

1. A control apparatus comprising:
at least one processor; and
a memory having stored thereon instructions which, when executed by the at least one processor, cause the control apparatus to:
obtain first data generated by a first imaging apparatus imaging an object and second data generated by a second imaging apparatus imaging an object, wherein each of the first data and the second data includes at least two of image data or video data, meta information about the object, and attached information indicating one of a status at the time of imaging and a status after imaging;
select one or more comparison targets from the image data or the video data, the meta information, and the attached information included in each of the first data and the second data;
evaluate, based on the selected one or more comparison targets included in the first data and the second data, a relationship between the object imaged by the first imaging apparatus and the object imaged by the second imaging apparatus; and
perform processing for connecting the first imaging apparatus and the second imaging apparatus in accordance with a result of the evaluation.

2. The control apparatus according to claim 1, wherein the instructions, when executed by the at least one processor, further cause the control apparatus to assign an ID to each of the first data and the second data for identifying each of the first data and the second data.

3. The control apparatus according to claim 1, wherein the instructions, when executed by the at least one processor, further cause the control apparatus to select the one or more comparison targets based on at least one of the image data or the video data included in the first data, a feature amount of the image data or the video data included in the first data, the image data or video data included in the second data, and a feature amount of the image data or the video data included in the second data.

4. The control apparatus according to claim 1, wherein the instructions, when executed by the at least one processor, further cause the control apparatus to select the one or more comparison targets based on one of a time and a position at which the first data and/or the second data is generated.

5. The control apparatus according to claim 1, wherein if the instructions, when executed by the at least one processor, further cause the control apparatus to evaluate the object imaged by the first imaging apparatus and the object imaged by the second imaging apparatus have a close relationship, perform processing for connecting the first imaging apparatus and the second imaging apparatus.

6. The control apparatus according to claim 1, wherein the instructions, when executed by the at least one processor, further cause the control apparatus to instruct the first imaging apparatus and/or the second imaging apparatus to be connected to each other via the control apparatus.

7. The control apparatus according to claim 1, wherein the instructions, when executed by the at least one processor, further cause the control apparatus to instruct the first imaging apparatus and/or the second imaging apparatus to be connected to each other via an external access point.

8. The control apparatus according to claim 1, wherein the instructions, when executed by the at least one processor, further cause the control apparatus to instruct the first imaging apparatus and/or the second imaging apparatus to be directly, wirelessly connected to each other.

9. An imaging apparatus comprising:
at least one processor; and
a memory having stored thereon instructions which, when executed by the at least one processor, cause the imaging apparatus to:
generate first data generated by the imaging apparatus imaging an object;
obtain second data generated by a second imaging apparatus imaging an object, wherein each of the first data and the second data includes at least two of image data or video data, meta information about the object, and attached information indicating one of a status at the time of imaging and a status after imaging;
select one or more comparison targets from the image data or the video data, the meta information, and the attached information included in each of the first data and the second data;
evaluate, based on the selected one or more comparison targets included in the first data and the second data, a relationship between the object imaged by the imaging apparatus and the object imaged by the second imaging apparatus; and
perform processing for connecting the imaging apparatus and the second imaging apparatus in accordance with a result of the evaluation.

10. A control method comprising:
obtaining first data generated by a first imaging apparatus imaging an object and second data generated by a second imaging apparatus imaging an object, wherein each of the first data and the second data includes at least two of image data or video data, meta information about the object, and attached information indicating one of a status at the time of imaging and a status after imaging;
selecting one or more comparison targets from the image data or the video data, the meta information, and the attached information included in each of the first data and the second data;
evaluating, based on the selected one or more comparison targets included in the first data and the second data, a relationship between the object imaged by the first imaging apparatus and the object imaged by the second imaging apparatus; and
performing processing for connecting the first imaging apparatus and the second imaging apparatus in accordance with a result of the evaluating.

11. A control method for an imaging apparatus, the control method comprising:
generating first data generated by the imaging apparatus imaging an object;
obtaining second data generated by a second imaging apparatus imaging an object wherein each of the first data and the second data includes at least two of image data or video data, meta information about the object, and attached information indicating one of a status at the time of imaging and a status after imaging;
selecting one or more comparison targets from the image data or the video data, the meta information, and the attached information included in each of the first data and the second data;
evaluating, based on the selected one or more comparison targets included in the first data and the second data, a relationship between the object imaged by the imaging apparatus and the object imaged by the second imaging apparatus; and
performing processing for connecting the imaging apparatus and the second imaging apparatus in accordance with a result of the evaluating.

12. A non-transitory computer-readable storage medium storing a computer program for causing a computer to execute an imaging method, the imaging method comprising:
obtaining first data generated by a first imaging apparatus imaging an object and second data generated by a second imaging apparatus imaging an object, wherein each of the first data and the second data includes at least two of image data or video data, meta information about the object, and attached information indicating one of a status at the time of imaging and a status after imaging;
selecting one or more comparison targets from the image data or the video data, the meta information, and the attached information included in each of the first data and the second data;
evaluating, based on the selected one or more comparison targets included in the first data and the second data, a relationship between the object imaged by the first imaging apparatus and the object imaged by the second imaging apparatus; and
performing processing for connecting the first imaging apparatus and the second imaging apparatus in accordance with a result of the evaluating.

13. A non-transitory computer-readable storage medium storing a computer program for causing a computer to execute an imaging method, the imaging method comprising:
generating first data generated by an imaging apparatus imaging an object;

obtaining second data generated by a second imaging apparatus imaging an object wherein each of the first data and the second data includes at least two of image data or video data, meta information about the object, and attached information indicating one of a status at the time of imaging and a status after imaging;

selecting one or more comparison targets from the image data or the video data, the meta information, and the attached information included in each of the first data and the second data;

evaluating, based on the selected one or more comparison targets included in the first data and the second data, a relationship between the object imaged by the imaging apparatus and the object imaged by the second imaging apparatus; and performing processing for connecting the imaging apparatus and the second imaging apparatus in accordance with a result of the evaluating.

* * * * *